United States Patent [19]
Chen et al.

[11] Patent Number: 5,548,735
[45] Date of Patent: Aug. 20, 1996

[54] SYSTEM AND METHOD FOR ASYNCHRONOUSLY PROCESSING STORE INSTRUCTIONS TO I/O SPACE

[75] Inventors: Wen-Tzer T. Chen; Steven M. Thurber; Gary Y. Tsao, all of Austin, Tex.

[73] Assignee: International Business Machines Corporation, Armonk, N.Y.

[21] Appl. No.: 122,040

[22] Filed: Sep. 15, 1993

[51] Int. Cl.⁶ .................................................. G06F 13/00
[52] U.S. Cl. ...................... 395/375; 364/239; 364/239.7; 364/240.4; 364/241.8; 364/DIG. 1
[58] Field of Search ..................................... 395/250, 325, 395/500

[56] References Cited

U.S. PATENT DOCUMENTS

| | | | |
|---|---|---|---|
| 4,547,849 | 10/1985 | Louie et al. | 395/325 |
| 4,875,160 | 10/1989 | Brown, III | 395/375 |
| 4,920,480 | 4/1990 | Murakami et al. | |

FOREIGN PATENT DOCUMENTS

| | | |
|---|---|---|
| 433520A1 | 6/1991 | European Pat. Off. |
| 94306541 | 1/1995 | European Pat. Off. |
| 62-226260 | 10/1987 | Japan |

OTHER PUBLICATIONS

*IBM RISC System/6000 Technology*, 1980, Austin, Texas, "RISC System/6000 Hardware Overview", H. B. Bakoglu et al, pp. 8–15.

*IBM RISC System/6000 Technology*, 1990, Austin, Texas, "RSC System/6000 I/O Structure", R. Arimilli et al, pp. 56–60.

IBM TDB, "I/O Channel Controller System Bus Interface Unit Receive Controller", vol. 32, No. 5B, Oct. 1989, p. 72.

J. Nicholson et al. IBM RISC System/6000 Tech. "RISC System/6000 I/O Structure".

*Primary Examiner*—Kevin J. Teska
*Assistant Examiner*—Agni Mohamed
*Attorney, Agent, or Firm*—Mark E. McBurney; Andrew J. Dillon

[57] ABSTRACT

A system and method for asynchronously managing the issuance of program I/O store instructions from a high speed central processor to a multiplicity of relatively lower speed I/O adapter devices. An interface between the central processor and the I/O adapter devices includes a program I/O store queue, a state machine, and a token pool related in count to the concurrent processing capabilities of I/O controllers. The interface queue includes information for uniquely identifying program I/O store instructions by adapter device destination and user application program to manage error recovery. As preferably implemented, the interface system and method also distinctly manages program I/O instructions requiring synchronous execution, such as program I/O load instructions.

5 Claims, 7 Drawing Sheets

BUID : uniquely identify a BUC (Bus Unit Controller)

TAG : uniquely identify an I/O operation within a BUC. This field is optional. For current IOCC implementation, TAG field is not required since the BUID can uniquely identify the destination or source of an I/O operation.

P : APIOS is pending in APIOS queue if P=1. For P=0, the entry is invalid and available.

I : APIOS is already issued to BUC if I=1. If I=0 and P=1, the state machine will issue this I/O operation when a token can be acquired from the associated BUC's token pool.

Count : Number of bytes for this APIOS in the data area.

Data Area : for storing data associated with the APIOS entry.

I/O Address : this address is used for retry if recoverable error detected.

FIG. 6

SYSTEM AND METHOD FOR ASYNCHRONOUSLY PROCESSING STORE INSTRUCTIONS TO I/O SPACE

BACKGROUND OF THE INVENTION

The present invention is generally directed to the management of instructions being processed in a high speed computer. More particularly, the invention relates to a system and method of use for interfacing a high speed processor to one or more I/O bus controllers for the asynchronous management of instructions written to I/O space.

The rapid evolution of processor technology in terms of clock rates and the number of instructions executed per clock cycle has created a computer architecture environment in which operations other than the execution of instructions by the central processor limit the execution rates of programs. An area of particular concern involves processor management of program defined input/output (I/O) instructions. The performance degradation caused by processor synchronized program I/O operations is particularly evident for contemporary processors having clock rates approaching or exceeding 100 Mhz given that clock synchronized I/O operations occur at I/O execution rates approximately an order of magnitude slower. The speed differential is typical for synchronized program load/store to I/O address space in that the conventional practice requires the central processor to wait until the I/O bus controller and related I/O device complete their operations. As a consequence, program I/O instructions have proven to be very undesirable for high speed computers.

Although new formulations of processor instructions which eliminate or minimize program I/O instructions are possible, there exist the overwhelming need to maintain compatibility with existing software which supports synchronous program I/O operations. Thus, it is important to have a hardware architecture which can directly execute the voluminous libraries of existing programs.

Given that program I/O "load" operations are normally followed by processor instructions which use the loaded data, namely the existence of strong dependency between the program I/O "load" instruction and the successive processing instructions, little benefit can be gained from the refined management of program I/O "load" instructions. In contrast, the present invention focuses on the improved management of I/O "store" operations to I/O space by using an interface between the central processor and I/O system.

An interface which manages program I/O store operations potentially provides significant processor efficiency improvements. However, the interface must be capable of running correctly with existing software and must provide a mechanism for managing error recover of I/O operations executing asynchronously to the processor.

Thus, there exists a need for a system architecture and method of operation by which a central or main processor can issue store instructions to I/O address space and not incur a stall as a consequence of the slow relative speed of the I/O system, yet retain full software compatibility and manage error recover.

SUMMARY OF THE INVENTION

The objective of the present invention is to provide an interface between the high speed central processors and relatively low speed I/O systems of contemporary computer systems. The objective being to accept processor synchronized program I/O operations and to asynchronously manage the execution of the program I/O within the I/O system.

The asynchronously operable program I/O interface of the present invention provides an architecture and method of operation by which a central processor issuing a program I/O instruction can immediately continue with the execution of successive processor instructions, independent of the progress of the program I/O instruction being executed by the relatively slower I/O system. In one form, the invention involves an interface system which connects a main processor to an I/O bus controller through a means for receiving I/O store information synchronized to the main processor issuance of I/O store instructions and a means for transmitting I/O store information synchronized to the I/O bus controller execution of I/O store instructions, the main processor rate of I/O instruction issuance differing from the I/O processor rate of I/O instruction execution. In another form, the invention is directed to a method of operating an interface between a main processor and an I/O bus controller, the I/O bus controller rate of execution of program I/O instructions being asynchronous to the main processor rate of execution, comprising steps of receiving I/O store information synchronized to the main processor issuance of I/O store instructions and transmitting I/O store information synchronized to the I/O bus controller execution of I/O store instructions.

A preferred implementation of the invention consists of an interface between the main processor, typically a CPU including at least one each of fixed point unit, floating point unit and branch processing unit, and a system bus shared by the main memory and multiple I/O bus controllers. The interface manages program I/O instructions issued by the main processor to an I/O bus controller connected to the system bus. More particularly, the invention, as preferably embodied, includes within the interface a processor specific interface section and a system bus specific interface section, controlled and interconnected through a state machine. The state machine queues program I/O instructions received from the main processor and asynchronously issues program I/O instructions from the queue in keeping with a token pool established according to the resources of the I/O bus controllers the system bus. Error recovery is performed by including within the queue, and in association with each program I/O instruction, unique identifiers for coordinating error recover. As preferably contemplated, main processor operations other than program store instructions to I/O address space, normally those directed to main memory or cache, continue to be managed in conventional manner. The same situation applied to processor instructions which load from I/O address space.

These and other features of the invention will be more fully understood and appreciated upon considering the description of the detailed embodiment as appears hereinafter.

DESCRIPTION OF THE PREFERRED EMBODIMENT

The invention as now described by specific embodiment with reference to particular drawings provides the desired ability to free the main processor from I/O processor delays associated with the actual execution of program I/O store instructions to directed to I/O address space. The high speed main processor continues executing new instructions while the program I/O store instruction is asynchronously managed by the interface system.

Figure 1:
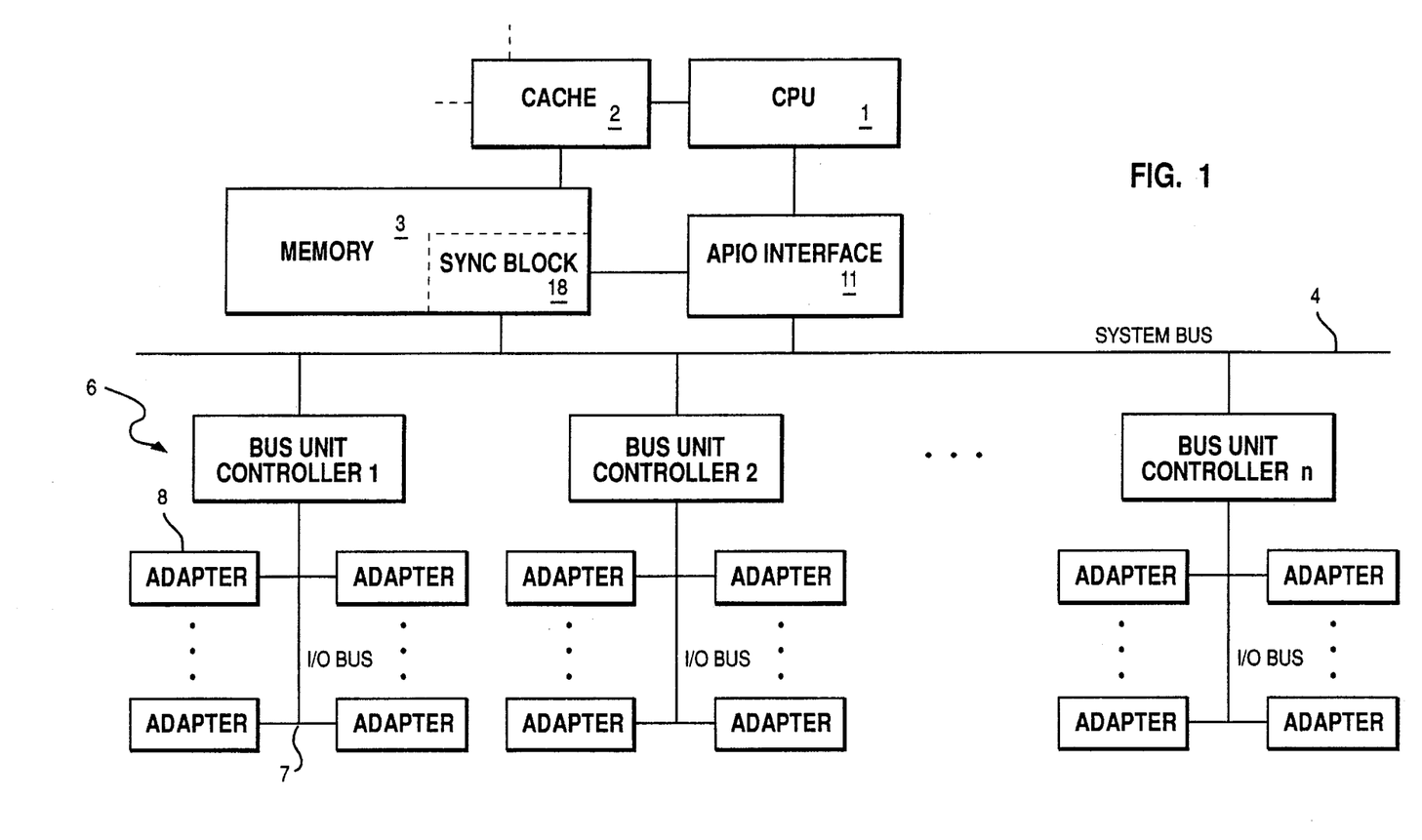
FIG. 1 is a schematic block diagram of a computer system.

An illustration of a system having an asynchronous program I/O (APIO) store interface is schematically depicted in FIG. 1 of the drawings. The general architecture is similar to that in the RISC System/6000™ workstation product commercially available from IBM Corporation. The depiction in FIG. 1 includes a main or central processing unit (CPU) 1, conventionally comprised of one or more fixed point processing units, floating point processing units and branch processing units. Connected directly to the main or central processing unit 1 is the high speed cache memory 2, and in succession therefrom the lower speed but extended size main memory 3. A system bus 4 commonly interconnects main memory 3 with a multiplicity of bus unit controllers, generally at 6. In the context of the RISC System/6000 architecture noted earlier, system bus 4 corresponds to the system I/O (SIO) bus and the bus unit controllers functionally correspond to the I/O channel controllers (IOCC which interface the system bus to a multiplicity of I/O buses, such as Micro Channel™ I/O buses 7. I/O adapter devices 8 are connected directly to the I/O buses 7 and are the end recipients of the program I/O store instructions issued by processor 1. Although adapters 8 can be moderate speed devices, more commonly, they are relatively low speed communication or nonvolatile storage devices, such as disk drives, that process data at a rate which is at least an order of magnitude slower than processor 1.

The conventional architecture provides relatively direct coupling between processor 1 and system bus 4. Program store operation, directed to an address range assigned to I/O, are routed onto the system bus for eventual receipt by the appropriate bus control unit 6 and I/O bus 7 resident adapter 8. Since the I/O store operation is completed at the speed of the I/O adapter, the relatively high speed processor is stalled until the adapter acknowledges full completion of the program I/O store operation.

The invention, as presently embodied, introduces an asynchronous program I/O interface mechanism 11 positioned between processor 1 and system bus 4, to manage program I/O store instructions issued by processor 1. Asynchronous program I/O (APIO) interface 11 decouples the processor synchronized instructions and allows their asynchronous completion by the adapter designated by I/O address.

APIO interface 11 preferably includes a program I/O queue with logic, a bus unit controller token pool, and a state machine. This preferred embodiment is depicted schematically in FIG. 2. Processor interface 12 and system bus interface 13 include signal matching and routing logic to manage the address, data and control signals entering and leaving APIO interface 11. The key functional blocks within the APIO interface are the queue and associated logic 14, the bus unit controller token pool 16, and the state machine 17. The particulars of each will be described individually below.

Figure 2:
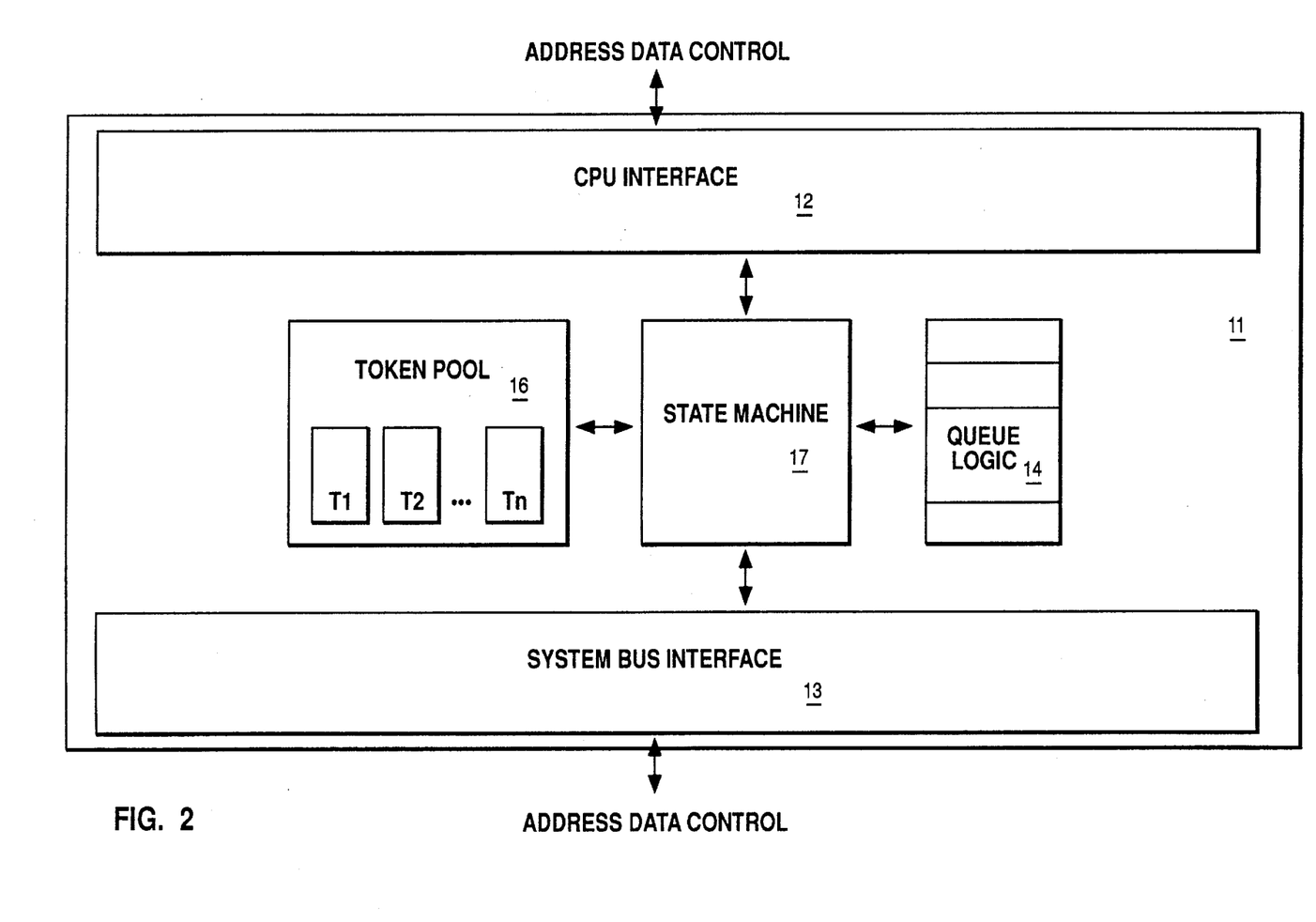
FIG. 2 is a schematic block diagram of an asynchronous program I/O interface.

APIO queue and logic 14 receives and stores program I/O store instructions issued by processor 1 (FIG. 1). Each entry in the queue represents one program I/O store instruction, including the data associated therewith. A set of pointers manipulated by state machine 17 manages the receipt and issuance of the program I/O store instructions. One pointer advances to designate the next available entry location whenever a program I/O store is written. The other pointer identifies the next pending entry to be issued by the state machine onto the system bus. At initialization, both pointers are set to the beginning of the queue. The size of the queue is at the discretion of the system designer, thereby allowing for larger queues where large bursts of program I/O store operations are expected.

Token pool 16 controls by token assignment the access to but unit controllers 6 (FIG. 1) in the course of issuing program I/O store instructions from queue 14. An instruction identified by pointer in queue 14 is issued to a bus unit controller only if a token associated with that bus unit controller is at that time available from token pool 16. The tokens in pool 16 are grouped in correspondence to the number of bus unit controllers, in the example shown being "n", where the number of tokens in each group is based upon the number of simultaneous instructions manageable by the corresponding bus unit controller. For example, if a bus unit controller can simultaneously manage three program I/O store operations, the group of tokens associated with that bus control unit would also be three. This architecture optimally matches the issuance of program I/O store instructions to the capabilities of the bus unit controllers.

At system initialization, the tokens are preallocated into the groupings in token pool 16 based upon the number and resources of the bus unit controllers. Thereafter, issuance of program I/O store instructions to bus unit controllers is contingent upon the availability of a token from the token pool group. Upon completion of an instruction as indicated by a bus unit controller acknowledgment, the token is returned to the corresponding group in the token pool. This architecture and method of operation permits out-of-order issuance of program I/O store instructions to different bus unit controllers in situations where the program I/O store instructions are not distributed evenly among the bus unit controllers. The order of issuance can, of course, be constrained by limiting the number of tokens.

Figure 3:
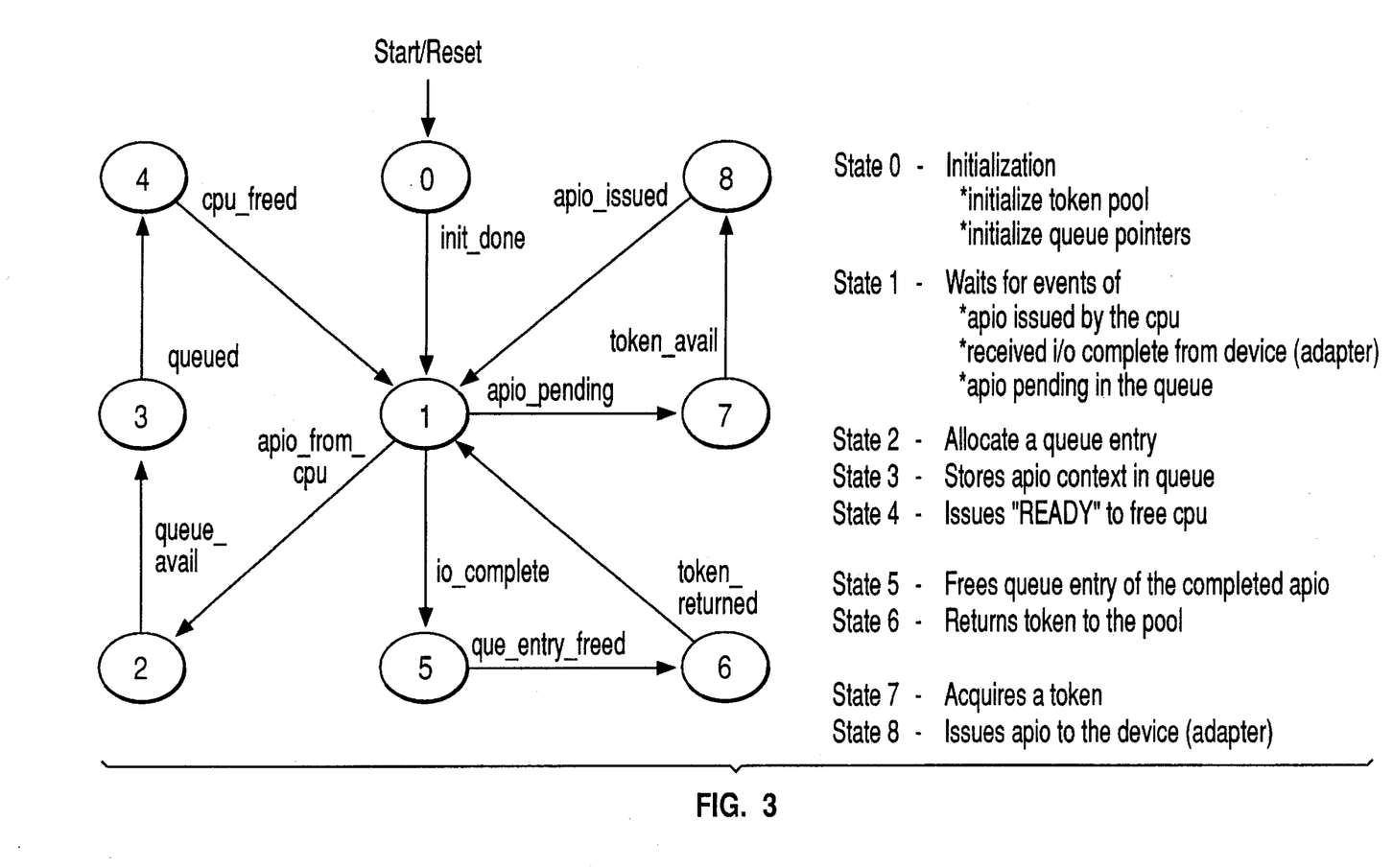
FIG. 3 schematically depicts and describes the operation of the state machine.
Figure 4:
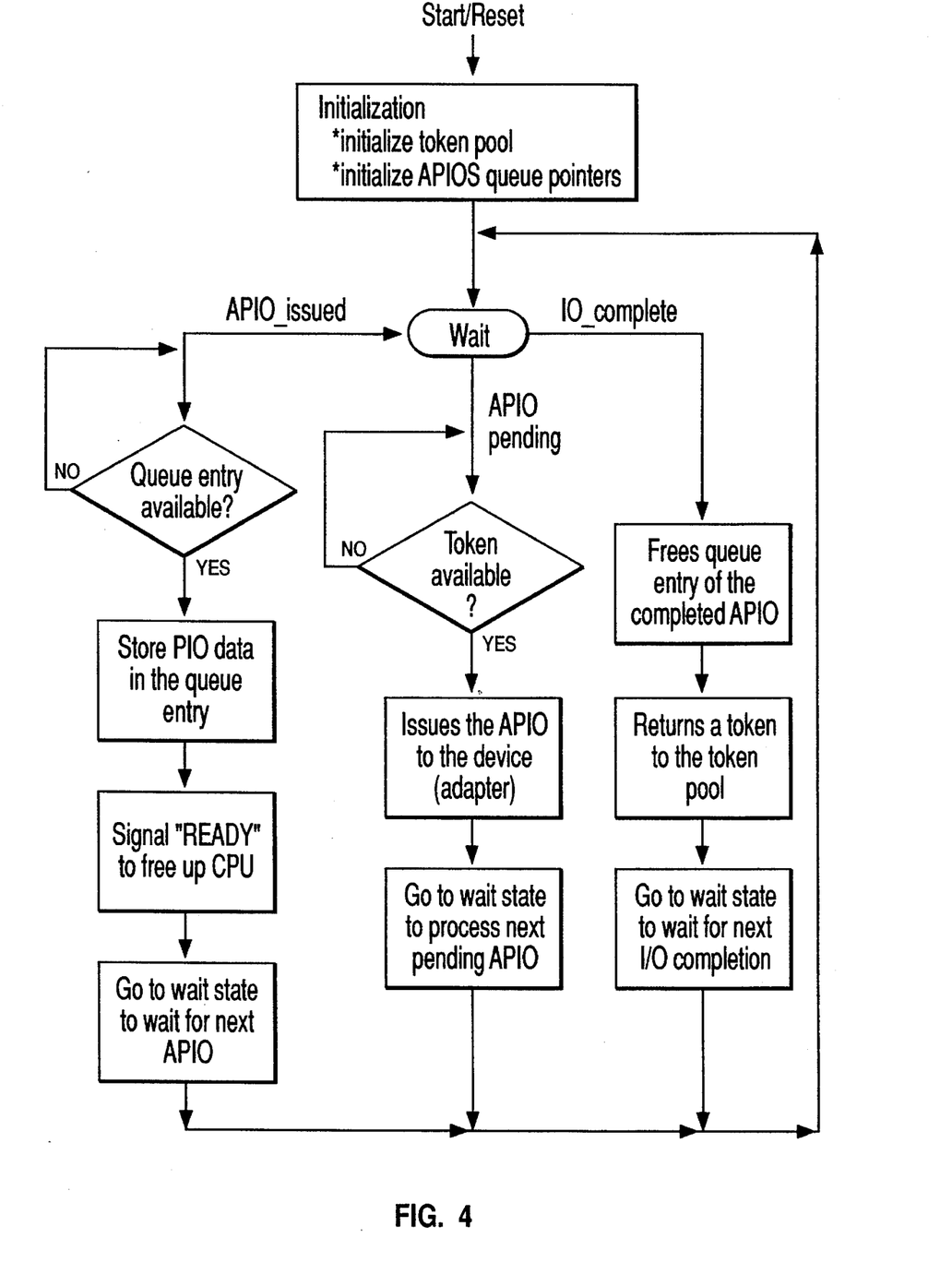
FIG. 4 is a schematic flow diagram of the asynchronous program I/O interface operation.

The last functional element in APIO interface 11 of FIG. 2 is state machine 17. The state machine manages queue 14 and token pool 16 to control the interfaces to the processor and the system bus. The key states and related transition conditions associated with state machine 17 are schematically depicted and described in FIG. 3 of the drawings. A flow diagram of the operations appears in FIG. 4. When a program I/O store instruction is issued by processor 1 (FIG. 1), state machine 17 initiates a store of the contents to the next available queue location designated by pointer in queue and logic unit 14. If the queue is full, the processor is held off until an entry location is available. The designation of a full queue is responsive to an overlap of pointer positions, which activates the state machine to inhibit any further entry of program I/O store instructions. Once a program I/O store instruction is accepted, the state machine notifies the processor of the acceptance by activating a ready signal, and then advances the pointer in queue 14 to the available next entry. The ready signal allows the processor to resume executing successive program instructions while APIO interface 11 takes over the management of the program I/O store instruction.

State machine 17 also manages the issuance of program I/O store instructions from queue and logic unit 14. The state machine attempts to allocate a token from token pool 16 to the next successive program I/O store instruction in the queue. When a token associated with the bus unit controller identified in the program I/O store instruction becomes available, the state machine issues the instruction from the queue, sets a bit to indicate such issuance, and advances the pointer to the next queue entry. Thereafter, the state machine waits for an acknowledgment of a completed program I/O store operation, an acknowledgment issued by adapter device 8 when the instruction has executed. Upon receipt of such acknowledgment from the adapter device, the state machine returns the token associated with the bus unit controller to the pool. Also, the acknowledgment initiates a state machine search to find the queue entry associated with the acknowledgment to allow use of the queue entry for a succeeding instruction. The search for the entry is accomplished using a unique identifier composed of a bus unit identification and an I/O operation tag, described in more detail hereinafter. Retention of the program I/O store instructions and associated identifiers in queue 14 until after the acknowledgment allows recovery in the event of an error during adapter execution of the program I/O store instruction.

Another aspect of APIO interface 11 involves the management of instructions which continue to be synchronized between processor 1 and adapter 8 (FIG. 1). These include synchronously accomplished program I/O load instructions and special program I/O store instructions which require synchronous execution. The ability to manage the latter ensures compatibility with existing software. When the state machine recognizes a program I/O load instruction or a special synchronous program I/O store instruction, the ready signal to the processor 1 remains deactivated until the APIO interface receives an acknowledgment of completion from the corresponding adapter device 8. At that time, the state machine transmits the ready signal to processor 1. If the instruction is a program I/O load, the I/O load instruction is issued to the designated device upon availability and the ready signal to the processor is delayed until after the loaded data is transmitted to the processor by the APIO interface.

The management of special synchronous program I/O store operations can be described with greater specificity by considering aspects of the earlier noted RISC System/6000 architecture. Each program I/O instruction includes bits which authorize access to specific bus unit controller address space. Since reserved bits in such fields were by original architecture definition mandated to be zeros, the change of a reserve bit to a binary "1" can serve to identify program I/O store instructions capable of asynchronous operation. State machine 17 in APIO interface 11 examines the bit when the program I/O store instruction is issued by the processor. If the bit is set to "1∞, the state machine latches the program I/O instruction into the queue for asynchronous resolution and returns the earlier described ready signal to the processor. On the other hand, if the state machine recognizes from the presence of a "0" bit that the program I/O instruction is to be synchronously managed, the state machine holds the processor. The processor hold continues until all pending and outstanding asynchronously operable program I/O store operations directed to the same bus unit controller are completed before releasing the synchronous program I/O instruction. Note that a synchronous program I/O store or load instruction can be moved ahead of queued asynchronous program I/O store instructions if the synchronous instruction is directed to a bus unit controller not subject to an asynchronous program I/O store still pending in the queue.

This preferred implementation of the invention, which permits the use of both synchronous and asynchronous store instructions without requiring any changes in existing synchronous code while guaranteeing accuracy of the I/O access, uses an existing but unassigned bit field. Thus, all existing system and application software having the bit field "0" is treated as synchronous while all new asynchronous program I/O store instructions are identified and expeditiously processed upon the detection of a "1" in the designated field.

The practice of asynchronous execution of instructions, namely I/O instruction execution differing in order from the execution of the processor, requires structural resources to ensure that all normally recoverable errors can be recovered. To facilitate the error recovery process, each entry in queue 14 is configured to be accessible directly by the processor. In the event an error occurs during an asynchronous program I/O store operation, the affected bus unit controller 6 (FIG. 1) transmits an external interrupt notice signal to processor 1 by conventional posting or like. Responsive thereto, the processor initiates an error recovery process which typically includes a retry of the asynchronous program I/O store instruction identified as having been in error, and a reporting of the error to the device or user program within the context in which the error occurred.

In a generalized form, the asynchronous program I/O store instruction causing the error is identified through a processor accomplished search of bus unit controller ID bits and stored instruction tag bits. A physical address field associated with the device and uniquely identified by the combination of bus unit controller and tag bits identifies the faulty device.

The key to the management of error recovery for program I/O store operations executed asynchronous to the execution of instructions in the main processor lie with determining three pieces of information, namely, the asynchronous program I/O store which caused the error, the adapter device in which the error occurred, and the user program process which issued the asynchronous program I/O store instruction. To report an error, there is a need for enough information to link the error location to the user process which issued the instruction which caused the error. If the asynchronous program I/O store instruction is issued by a device driver, there is direct user process information to provide that link. However, on occasion, kernel type device drivers are not used and the link must go back to the user program directly. Error recovery must be able to handle both situations. Preferably, the implementation should be capable of reissuing the asynchronous program I/O store instruction and associated data if a recoverable adapter device I/O error occurs. For nonrecoverable errors, the system user must be notified both of the error and the adapter device within which the error occurred.

A preferred implementation which accomplishes these objectives involves the combined use of state machine 17 (FIG. 2), queue 14 (FIG. 2), and a dedicated block in main memory 3, the latter corresponding to asynch block 18 in FIG. 1. In general, the state machine performs operations to provide error recovery, asynch block 18 stores information to accomplish error recovery, and queue 14 retains instructions for reissuance upon recovery.

Figure 5:
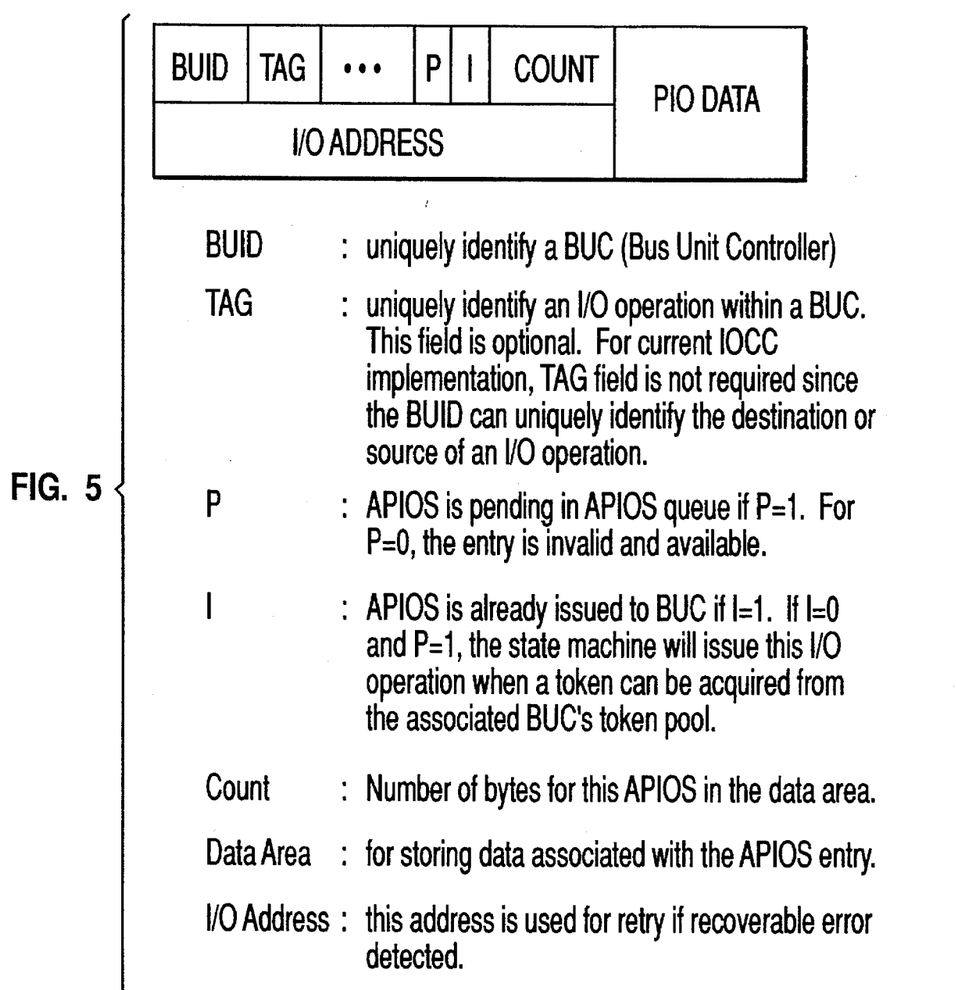
FIG. 5 schematically depicts and describes the structure of the queue data.

Each entry in queue 14 (FIG. 2) is composed of the information defined by the fields shown schematically in FIG. 5. The first field, BUID, uniquely identifies the bus unit controller 6 (FIG. 1). In conjunction with the tag field, which uniquely identifies I/O adapter device 8 corresponding to the bus unit controller, these bits provide a unique identifier for each asynchronous program I/O store operation. The next field illustrated in FIG. 5 is reserved for future use. The successive fields, P and I, specify whether an asynchronous program I/O stored in a queue position is pending or available for use, and whether a queue position store instruction has been issued to a bus unit controller. Each entry also includes a count indicating the size of the asynchronous program I/O store data, the actual data and an address for retry actions in the event a recoverable error is encountered.

Queue 14 includes logic for interacting with state machine 17 to manage the storage of asynchronous program I/O store instructions received from the processor. Therein, when entry locations are available in the queue, asynchronous program I/O instructions are stored. Only after the successful completion of an I/O store instruction issued from a queue entry is that location marked as being free for a successive write by the processor. If a hardware error is detected for an entry undergoing processing in the I/O system (for example, as a consequence of the bus parity inconsistency, an adapter failure, or a time out overrun, etc.), a recovery sequence is initiated using the information still stored in the queue entry.

The size of queue 14 is determined by the overall system needs, taking into account such factors as the number of bus unit controllers, the number of associated adapter device, the relative speed of the adapters in relation to the processor, and the expected duty cycle and distribution of conventional instructions to program I/O store instructions. The goal is to minimize stalling of the main processor. Since the order of all asynchronous program I/O store instructions must be maintained, the placement of adapter devices with relation to bus unit controllers should be accomplished with reasonable consideration. In this regard, the adapter devices should be distributed among the bus unit controls in such a way that for the contemplated applications asynchronous program I/O store instructions are efficiently distributed among the bus unit controllers for substantially time concurrent execution.

Since the maintenance of order within queue 14 is accomplished by two pointers, a head pointer to indicate the next entries to be issued and a tail pointer to indicate the last completed entry, a full queue causes instructions emanating from the processor to be deferred until an entry is available. For this reason, the sizing of the queue is important. The logic in the queue manages the acceptance of asynchronous program I/O store instructions when an entry is available, frees up an entry when the I/O operation associated with the previous I/O instruction in the entry is completed, and maintains an issuing order of program I/O store instructions consistent with the processor generation of such instructions as directed to a specified adapter device.

The purpose of asynchronous block 18 within memory 3 in FIG. 1 is to link asynchronous program I/O store instructions to user programs executing on processor 1 when the user programs do not utilize device drivers. For application programs without device drivers for the adapter devices, the user program incorporates a routine which stores the program identifier and adapter device I/O address into asynch block 18 of memory 3 upon a call of the asynchronous program I/O store instruction. After the user program completes the program I/O store instruction, the asynch block entry is cleared. A synchronization instruction must be inserted to ensure that the store instruction is completed before any subsequent load instruction is initiated from the address range of the adapter device.

For operations not involving adapter devices, such as bus unit controller configuration routines, the user process or application program stores the program identification in asynch block 18 but invalidates the asynch block area before the program exits. Synchronization instructions are inserted as needed to avoid data inconsistencies between successive operations directed to the same bus unit controller.

Figure 6:
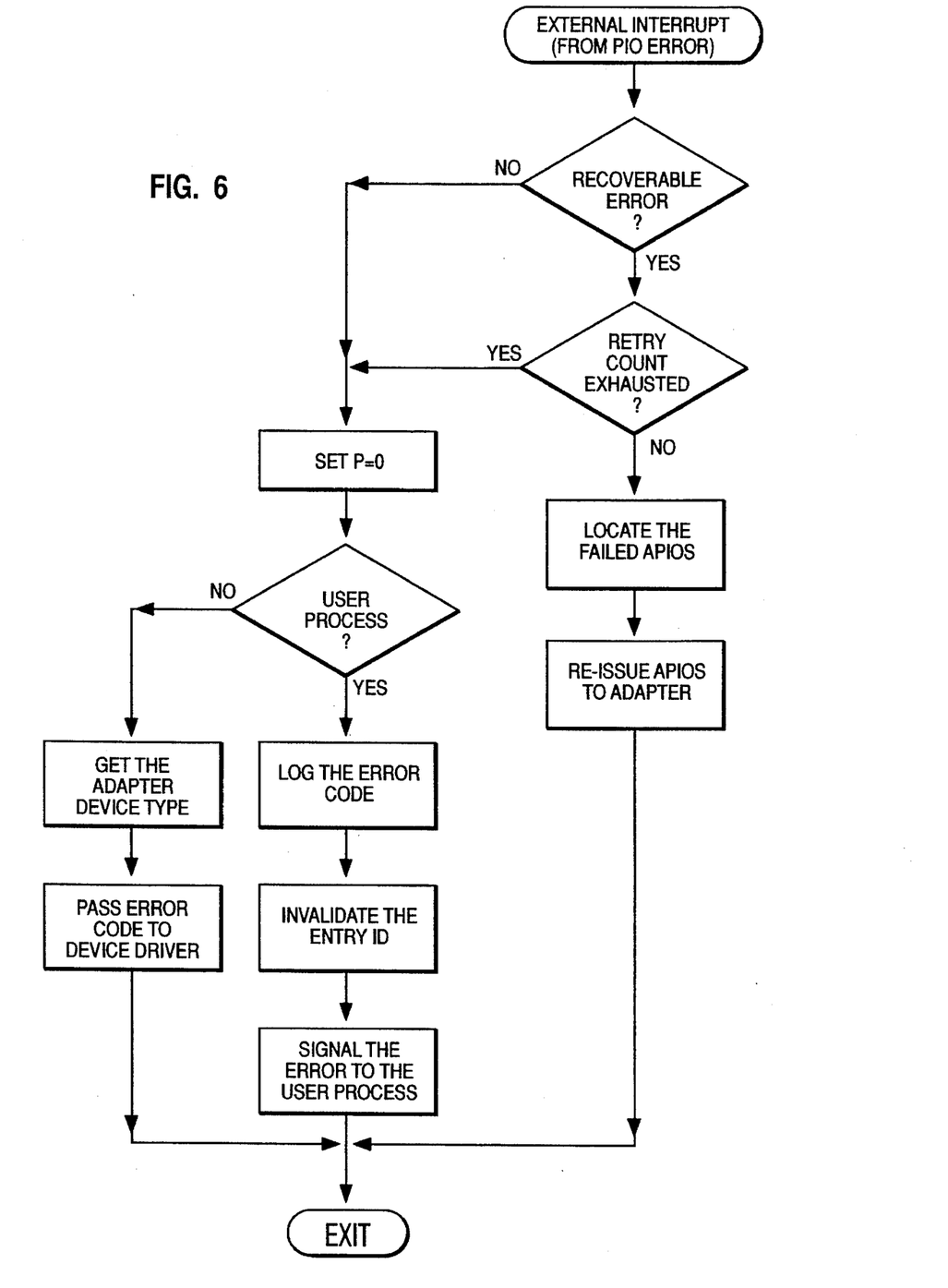
FIG. 6 is a schematic flow diagram of the error recovery operation.

The events associated with error recovery, both recoverable and non-recoverable, are shown by flow diagram in FIG. 6. When a nonrecoverable program I/O error is detected, the asynch area is searched to locate the program identifier of the user program. This enables the recovery routine to send the error code to the user. An example error recovery sequence involves the following elements:

the error is reported through an adapter device interrupt the program I/O status register identifies a program I/O error if the error is nonrecoverable, the P field in the queue entry associated with that program I/O instruction is set to "0", then go to A also, if the program I/O retry count is exhausted also set P to "0", then go to A locate the filed asynchronous program I/O store instruction by searching the queue and then issue a store instruction to the queue to reissue the failed entry exit the recover process

A if the error is not caused by the user program, then go to B log the error code and invalidate the entry in asynch block 18 signal the error to the user process exit the recovery process

B get the adapter device type from the physical I/O address and pass the error code and asynch program I/O queue information to the specific device driver thereafter the device driver handles the nonrecoverable error.

In implementing the error recovery, the tag and BUID fields of the queue entry identify the instruction causing the error. Since the asynch program I/O queue can be accessed by the processor through a program I/O operation, the processor has access to queue status and error information. Program I/O load errors are handled synchronously by the host software independent of the asynchronous program I/O interface.

Figure 7:
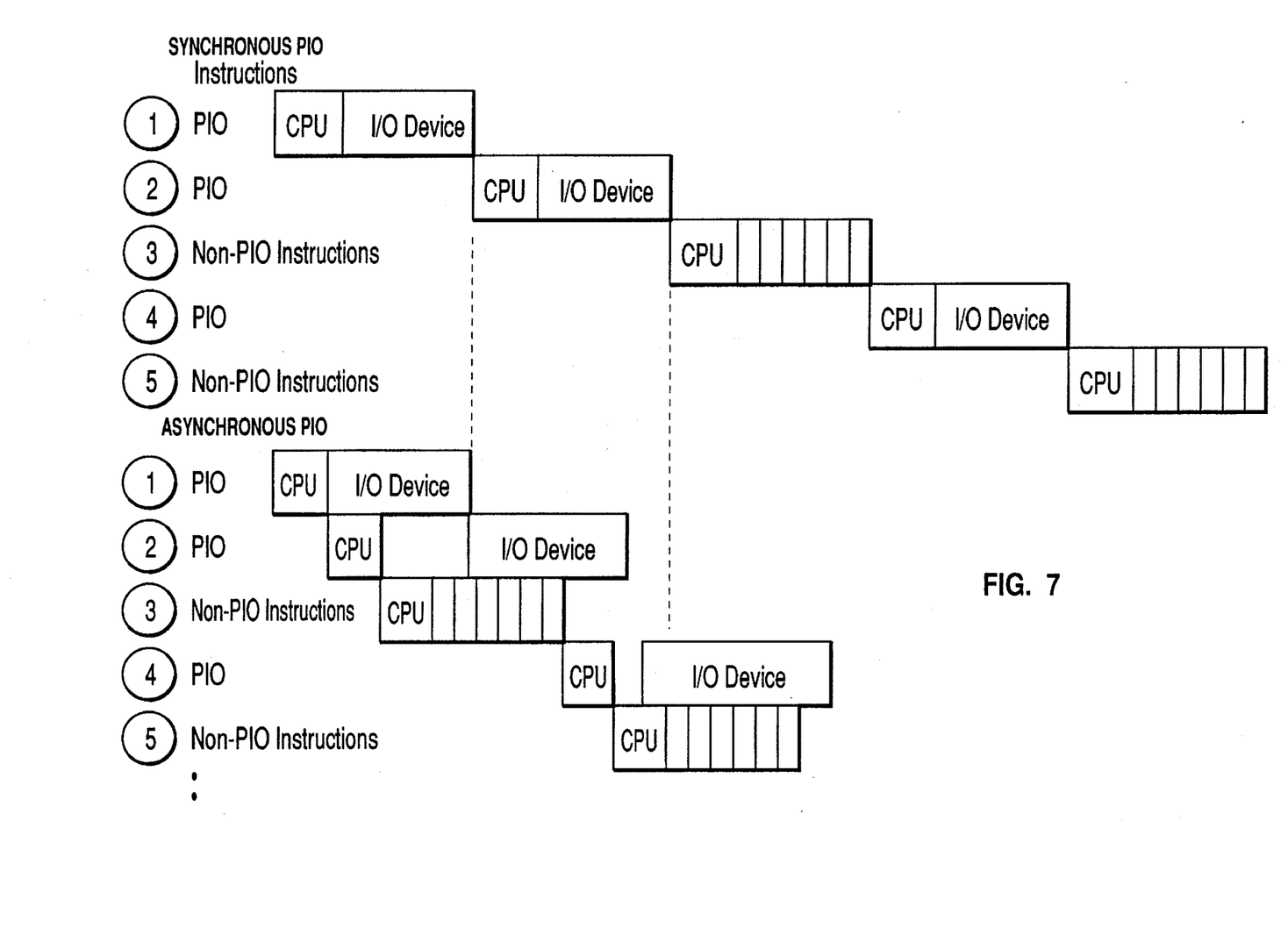
FIG. 7 is a schematic timing diagram comparing synchronous and asynchronous program I/O instruction execution.

FIG. 7 illustrates by time sequence comparison the relative performance of a system with and without an asynchronous program I/O interface. The upper sequence represents a fully synchronous program I/O store sequence. The lower sequence involves the same processor instructions accomplished in conjunction with an asynchronous program I/O store instruction interface of the form described herein. The first instruction is a program I/O store operation, including the processor time interval and the I/O store device time interval. Likewise, the second instruction is a program I/O operation. The third is considered to be a succession of nonprogram I/O instructions executed by the processor alone. The fourth involves a program I/O store instruction, while the fifth is, again, a sequence of nonprogram I/O instructions executed independently by the processor. Note the concurrency of execution in the lower sequence in contrast to that in the upper sequence. Foremost, it should be understood that the relative significance would be magnified in the real world where the execution of program I/O store instructions by I/O devices is at least an order of magnitude slower than the execution of instructions by the processor itself (the example depicts an I/O execution which is only six times slower than a processor execution).

The invention addresses and solves a major problem for new computer systems in which the overall performance of exceptionally high speed central or main processors is degraded as a consequence of performing program I/O store instructions.

Although the invention has been described and illustrated by way of specific embodiments, the systems and methods encompassed by the invention should be interpreted consistent with the breadth of the claims set forth hereinafter.

We claim:

1. An interface system for coupling a main processor to multiple bus controllers, said interface system comprising:

an I/O queue for receiving and storing multiple I/O storage instructions received from said main processor;

means for releasing said main processor for resumption of execution of program instructions in response to storage of an I/O storage instruction within said I/O queue;

means for uniquely relating each I/O storage instruction within said I/O queue to a particular bus controller utilizing a token pool; and means for initiating asychronous issuance of an I/O storage instruction from said I/O queue to said particular bus controller wherein said main processor is not delayed awaiting completion of said I/O storage instruction.

2. The interface system according to claim 1, wherein said means for initiating asynchronous of an I/O storage instruction from said I/O queue to said bus controller comprises a state machine responsive to a net of received and issued I/O storage instructions within said I/O queue.

3. The interface system according to claim 1, further including means for recovering from an I/O interrupt.

4. A method of operating an interface between a main processor and multiple bus controllers, said method comprising the data processing system implemented steps of:

receiving and storing multiple I/O storage instructions from said main processor within an I/O queue;

releasing said main processor for resumption of execution of program instructions in response to each storage of an I/O storage instruction with said I/O queue;

thereafter, initiating asynchronous issuance of an I/O storage instruction from said I/O queue to said particular bus controller wherein said main processor is not delayed awaiting completion of said I/O storage instruction.

5. The method of operating an interface between a main processor and a bus controller according to claim 4, wherein said step of initiating asynchronous issuance of an I/O storage instruction from said I/O queue to said particular bus controller further comprises the step of initiating asynchronous issuance of an I/O storage instruction from said I/O queue to said particular bus controller in response to a net of received and issued I/O storage instructions within said I/O queue.

* * * * *

UNITED STATES PATENT AND TRADEMARK OFFICE
CERTIFICATE OF CORRECTION

PATENT NO. : 5,548,735
DATED : August 20, 1996
INVENTOR(S) : Chen et al.

It is certified that error appears in the above-indentified patent and that said Letters Patent is hereby corrected as shown below:

Column 1, line 60: change "recover" to --recovery--

Column 2, line 49: change "applied" to --applies--

<u>In the Claims:</u>

Column 10, new line 18 (Claim 4): insert --uniquely relating each I/O storage instruction within said I/O queue to a particular bus controller utilizing a token pool; and-- after "queue;" and before "thereafter"

Signed and Sealed this

Twelfth Day of November, 1996

*Attest:*

BRUCE LEHMAN

*Attesting Officer*            Commissioner of Patents and Trademarks